United States Patent
Schade

(10) Patent No.: US 6,684,562 B1
(45) Date of Patent: Feb. 3, 2004

(54) SNAKE CATCHER

(76) Inventor: James Schade, 25166 Kerri La., Ramona, CA (US) 92065

( * ) Notice: Subject to any disclaimer, the term of this patent is extended or adjusted under 35 U.S.C. 154(b) by 0 days.

(21) Appl. No.: 10/248,263

(22) Filed: Dec. 31, 2002

(51) Int. Cl.$^7$ .................. A01M 23/34; A01K 15/00
(52) U.S. Cl. .................. 43/87; 43/5; 119/803; 119/804
(58) Field of Search .................. 43/87, 5; 119/801–804

(56) References Cited

U.S. PATENT DOCUMENTS

| | | | | |
|---|---|---|---|---|
| 750,797 A | * | 2/1904 | Bidwell .................. | 119/803 |
| 793,693 A | * | 7/1905 | Thompson .................. | 119/803 |
| 959,422 A | * | 5/1910 | Bechdolt .................. | 119/803 |
| 1,152,165 A | * | 8/1915 | Furnstahl .................. | 119/804 |
| 1,343,213 A | * | 6/1920 | Johnson et al. .................. | 119/804 |
| 1,393,527 A | * | 10/1921 | Guthrie .................. | 119/804 |
| 2,499,511 A | * | 3/1950 | Koger .................. | 119/803 |
| 2,616,123 A | * | 11/1952 | Armstrong .................. | 43/87 |
| 2,704,052 A | * | 3/1955 | Wood .................. | 43/87 |
| 3,319,609 A | * | 5/1967 | Pickard et al. .................. | 119/804 |
| 3,540,769 A | * | 11/1970 | Rosser .................. | 119/804 |
| 3,765,119 A | * | 10/1973 | Hare et al. .................. | 43/87 |
| 3,949,514 A | * | 4/1976 | Ramsey .................. | 43/87 |
| 4,179,837 A | * | 12/1979 | Gummeringer .................. | 43/87 |
| 4,208,827 A | * | 6/1980 | Starkey .................. | 43/87 |
| 4,250,653 A | * | 2/1981 | Davies .................. | 43/87 |
| 4,506,472 A | * | 3/1985 | Barman .................. | 43/87 |
| 4,513,527 A | * | 4/1985 | Wicklund .................. | 43/87 |
| 4,950,015 A | * | 8/1990 | Nejib et al. .................. | 294/19.1 |
| 5,832,651 A | * | 11/1998 | Arntz .................. | 43/5 |
| 5,979,106 A | * | 11/1999 | Butler .................. | 43/87 |
| 6,327,809 B1 | * | 12/2001 | Comes et al. .................. | 43/87 |
| 6,467,436 B1 | * | 10/2002 | Olausson .................. | 119/803 |

FOREIGN PATENT DOCUMENTS

| | | | | |
|---|---|---|---|---|
| CA | 530122 B1 | * | 9/1956 | .................. 43/87 |
| DE | 1275326 B1 | * | 8/1968 | .................. 43/87 |
| EP | 59676 B1 | * | 9/1982 | |
| FR | 2555020 B1 | * | 5/1985 | |
| FR | 2801170 B1 | * | 5/2001 | |
| IT | 443605 B1 | * | 12/1948 | .................. 43/87 |
| JP | 2001-299183 B1 | * | 10/2001 | |

\* cited by examiner

*Primary Examiner*—Darren W. Ark

(57) ABSTRACT

A plastic coated steel cable loop (20) is placed over the snake's head and the loop is tightened around the snake's neck. The loop (20) is on the end of a polyvinyl chloride pipe (24) which is about five feet long. The pipe has a smaller pipe (25) inside, which can be moved in and out controlling the size of the loop (20). The operator has control of the captured snake without entering the striking range of the snake. The snake catcher is made of low cost, weather resistant materials and can be stored outside where it can be quickly accessed when needed.

1 Claim, 1 Drawing Sheet

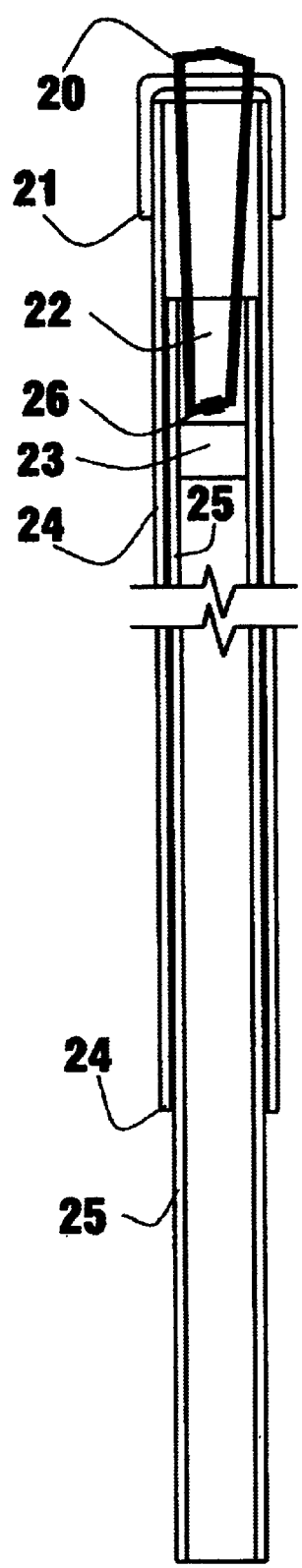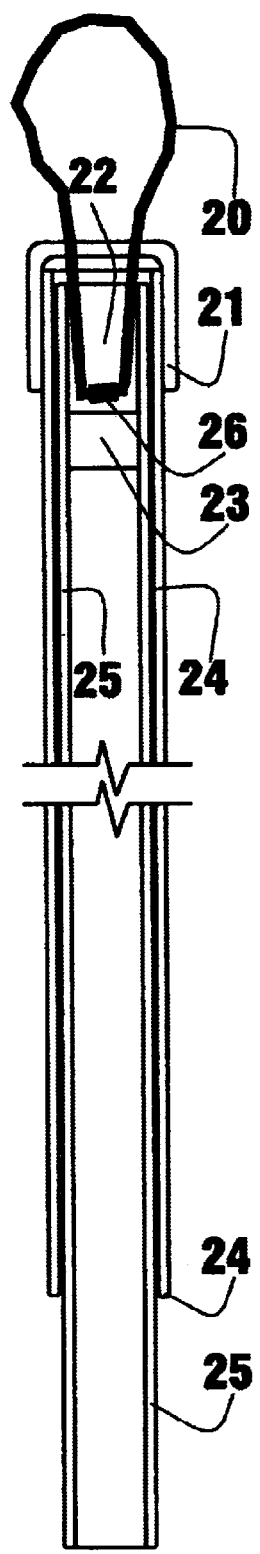

SNAKE CATCHER

BACKGROUND OF INVENTION

This invention relates to a hand held device for catching snakes.

BACKGROUND PRIOR ART

This invention relates generally to animal snares and snake catchers and has more particular reference to improvements in animal snares and snake catchers of the kind which are characterized by an elongated pole-like handle having at one end a noose operable from the other end of the handle.

The prior art is replete with a wide assortment of animal snares and snake catchers of the general class to which this invention pertains. The existing snares and catchers of this type, however, are deficient in certain respects when they are used to capture dangerous snakes. It is these deficiencies that the present invention seeks to overcome.

Some of the prior art is made for animals much larger than a snake. These devices must be constructed of strong materials to withstand the large forces that these big animals may exert. The stronger, heaver materials add weight and extra cost to these big animal devices. The present invention is made of low cost, weather resistant, materials that can withstand the forces that a snake can exert.

Sometimes it is only after a snake is captured that it is discovered to be a non-dangerous snake. The user may wish to release any beneficial or harmless snake unharmed. There may be some users who may wish to relocate dangerous snakes to a wild area. Many of the prior art snares rely on spring biasing to close the loop around the animal they wish to capture. The spring-biased snares have a tendency to injure or kill snakes. This disadvantage makes the spring biased snare unsuitable for capturing snakes.

The present invention is manually operated and a snake can be captured without injuring the snake.

The spring-biased devices must first be cocked before they are used. In the event that the snake is not captured on the first try then a spring loaded device will need to be reset to the cocked position before another attempt can be made. Sometimes the snake will move into thick brush trying to escape. It is difficult using a spring-biased snare to follow the snake through the thick brush without the open loop catching on the branches. Such spring loaded snares and catchers are difficult and time-consuming to operate. These disadvantages make the task of capturing the snake difficult, particularly a snake that is in motion.

The present invention has a loop that can be quickly opened and closed manually. If the snake is not captured on the first try, the loop can be quickly reset. If the snake moves into thick brush trying to escape, the user can follow the snake with the catcher in the loop-closed position. The user can quickly open the loop and catch the snake at the first opportunity.

Many of the prior art snares and catchers connect only one end of the loop to the moving section and the other end of the loop to the non-moving section. With only one end of the cable connected, the moving section must travel a greater distance before the loop is closed. This extra movement puts the user's hands in an awkward position. The present invention connects both ends of the loop to the moving section, which is superior for two reasons. First, it requires less hardware and assembly time. Secondly, because the moving section moves only half the distance to close the loop, the user's hands remain in a more effective position.

Many of the prior art snares pull the loop into a hollow tube. If this type of snare were used to capture a small snake the loop would pull the head of the snake into the hollow tube. These types of snares and catchers would have a tendency to harm any snake and small snakes would be difficult to remove from the hollow tube. As the loop closes using the present invention, the captured snake is held tightly against the end cap.

The present invention is easy to use and keeps the operators hands in one place at a safe distance away from the snake. This is superior to the prior art snares and catchers that require the operator to move one hand to operate a lever or other device for three reasons. First, it is better if the user's hands remain in one place. Secondly, many of the slides, levers, and locks make the device unnecessarily difficult to operate when the catcher is in a position other than an ideal position. Thirdly, some of the prior art snares require the operator to move one hand closer to the snake to operate a device, this unnecessarily puts the operators hand dangerously close to the snake. These more complicated devices also require more assembly time and the extra parts add to the total cost.

Some of the devices are designed for use close to animals that are not dangerous to humans. The present invention is superior for capturing dangerous snakes because it keeps the operator a safe distance away from the dangerous snake.

The present invention is constructed of weatherproof materials that can be stored outside where snakes are likely to be discovered. The present invention will work perfectly after being stored for long periods without any maintenance. This is superior to prior art that is made of material that is affected by the weather and needs to be stored inside which is a distance away from where snakes are likely to be discovered. Prior art that is not made of weatherproof material may not operate properly after being stored outside for long periods.

Some of the prior art has parts that are custom-made. These parts require special skills and special machinery to build. Making these parts is beyond the ordinary skills of most who are considered skilled at the art of making snares and snake catchers. The cost of having a small number of these custom-made parts made is generally very high. The present invention has no custom-made parts. Most home workshops have all the equipment needed to build the present invention. A person skilled in the art of snare and snake catcher building should be able to build one from the parts that are available at most hardware stores or home improvement centers at a very low cost.

Armstrong U.S. Pat. No. 2,616,123 ANIMAL AND POULTRY SNARE AND KILLER

This manually operated snare has only one end of the cable connected to the moving section. To close the loop one would push on the detent lever, which is located part way down the snare, and then pull on the T-handle. The T-handle may be awkward to use with the snare rotated. The solid metal center shaft has special recesses that are used as detents.

Arntz U.S. Pat. No. 5,832,651 ACTUATION ASSISTING FISH GAFF

This is a fishing gaff that uses hooks. It is not suitable for catching snakes.

Barman U.S. Pat. No. 4,506,472 SPRING LOADED SNARE

This spring-loaded device does use an end cap with two holes and the cable does run through the holes but only one cable connects the moving section. This is a small device used to kill trapped animals. It is not suitable for capturing snakes.

Bechdolt U.S. Pat. No. 959,422 HOG HOLDER

This is a manually operated hand held snare. It has only one end of the cable connected to the moving section. It does have a custom-made end cap called a snout block. It has a custom-made metal center section that also forms an open T-handle. The T-handle may be awkward to use with the snare rotated.

Bidwell U.S. Pat. No. 750,797 HOG HOLDER

This is a manually operated snare device. It has only one end of the cable connected to the moving section. It has a custom-made metal center section that also forms an open T-handle. The T-handle may be awkward to use with the snare rotated. It has a cable pulling into an open tube that would tend to damage any snake and the head of a small snake would be pulled inside of the tube. It is not suitable for capturing small snakes.

Butler U.S. Pat. No. 5,979,106 LIVE EEL BAIT DEVICE

This is a small manually operated snare device. Its small size makes it unsuitable for use with dangerous snakes. Pushing on the monofilament can form the loop on this small device but this would not work if the device were to be made longer.

Comes U.S. Pat. No. 6,327,809 ARTICLE SECURING SYSTEM

This is a small manually operated snare device. Its small size makes it unsuitable for use with dangerous snakes. It is shown inside a crab trap holding bait.

Davies U.S. Pat. No. 4,250,653 HUMANE ANIMAL TRAP

This device is a spring-loaded trap that uses three barrels and has several custom made parts. It has both ends of the loop connected to the moving section. This is not a hand held device. It is not suitable for capturing snakes.

Fuglielli FR 2 555 020-A1 DOG CATCHING DEVICE

This is a manually operated dog catching device. It has a custom-made Y-shaped end cap and a locking lever. The locking lever must be held down to change the size of the loop.

Garavano U.S. Pat. No. 443,605 DEVICE FOR CAPTURING AND IMOBILIZING ANIMALS

This device is a manually operated snare device. It has a custom-made outer housing, spring-loaded ratchet device and center rod with handle. The open T-handle may be awkward to use with the snare rotated.

Gummeringer U.S. Pat. No. 4,179,837 ANIMAL TRAP

This device is a spring-loaded animal trap with several custom-made parts. It has both ends of the loop connected to the moving section. This is not a hand held device. It is not suitable for capturing snakes.

Hare U.S. Pat. No. 3765119 SNARE DEVICE

This is a hand held snare device. This device has a flexible section that would make it impossible to control a captured snake. It is not suitable for capturing snakes.

Koger U.S. Pat. No. 2,499,511 HOG CATCHER AND HOLDER

This device is a manually operated snare device. It has a custom-made center rod, end cap, and handle. It has a T-handle that may be awkward to use with the snare rotated. It has only one end of the cable connected to the moving section.

Nejib U.S. Pat. No. 4,950,015 SYRINGE CAP CLAMP TOOL

The small size of this special purpose tool is not suitable for capturing dangerous snakes. It has many custom-made parts. If a snake catcher were to be made using these principals it would be a spring-loaded snare with a complicated trigger. It does not use an end cap and a small snake would be pulled into the bore.

Olausson U.S. Pat. No. 6,467,436 PET COLLAR DEVICE

This is a pet collar device. This is a small custom-made device for friendly animals. It is not suitable for capturing snakes.

Olivier EP 0 059 676 A1 DEVICE FOR CATCHING LARGE FISH

This device is a spring-loaded device for catching large fish. This device has a rigid loop as well as a flexible loop. If this device were to be used to catch a snake the rigid loop would not be an advantage. It has a handle, which may be awkward to use with the device rotated. It has a custom-made end cap and other custom-made parts.

Pastuck U.S. Pat. No. 530,122 ANIMAL TRAP

This small device is a spring-loaded animal trap with an electric trigger. It has an end cap, a battery and a solenoid. This is not a hand held device. It is not suitable for capturing snakes.

Pickard U.S. Pat. No. 3,319,609 ANIMAL RESTRAINER

This device is a manually operated hand held snare. It has a custom-made end cap, outside tube, inside tube and locking mechanisms. The locking mechanism must be unlocked before the noose size can be changed. It has only one end of the cable connected to the moving section.

Ramsey U.S. Pat. No. 3,949,514 SNARE

This is a spring-loaded snare with a trigger release. It has an intricate custom-made end cap and other custom-made components. It has only one end of the cable connected to the moving section.

Rosser U.S. Pat. No. 3,540,769 AUTOMATIC HAND HELD SNARE

This is a spring loaded hand held snare with a lever release.

Seon FR 2801170-A1 EQUIPMENT, FOR CAPTURING REMOTE BODIES

This is a manual hand held snare. It has a custom-made end cap and other custom-made components. It has only one end of the cable connected to the moving section. It has a side handle that slides forward and back. The operator would have to reach a long way forward to grasp the handle and there would be a danger of being bitten by the snake.

Starkey U.S. Pat. No. 4,208,827 ADJUSTABLE ANIMAL TRAP

This is a spring-loaded animal trap. It does have a custom-made end cap. This is not a hand held device. It is not suitable for capturing snakes.

Thompson U.S. Pat. No. 7,93,693 ANIMAL HOLDER

This is a simple hand held manual snare. It has no end cap and all smaller snakes would be pulled inside the bore. It has a T-handle that may be awkward to use with the snare rotated. Only one wire is connected to the moving section.

Wicklund U.S. Pat. No. 4,513,527 ANIMAL TRAP

This small spring loaded trapping device has many custom-made parts. This is not a hand held device. It is not suitable for capturing snakes.

Wood U.S. Pat. No. 2,704,052 DEVICE FOR RESTRAINING AND CAPTURING ANIMALS

This is a manual hand held snare with a locking device that allows the loop to be pulled smaller by the operator but will prevent the loop from being pulled larger by the animal. It requires two hands to release the lock so it may be difficult for the operator to reset the loop to full size. This device has a custom-made locking device and several other custom-made parts. It has a simple end cap. This device has one end of the cable fixed and the operator pulls upon the free end.

Wunnng U.S. Pat. No. 1,275,326 ANIMAL CATCHING AID

This is a manually operated hand held snare with a spring loaded locking device. The locking lever must be depressed to change the loop size. It has a custom-made inner shaft with notches for the locking device to engage. It also has a custom-made end cap and locking device. It has only one end of the cable connected to the moving section.

SUMMARY OF INVENTION

Therefore, it is the object of this invention to provide an effective device for capturing dangerous snakes. It is also an object that this device is made of low cost weather resistant materials.

BRIEF DESCRIPTION OF DRAWINGS

FIG. 1 Cut away view showing the snake catcher with a small loop.

FIG. 2 Cut away view showing the snake catcher with a large loop.

List of reference numbers

| | |
|---|---|
| 20 | Loop of plastic coated steel cable (type used for clothes lines) |
| 21 | End Cap (¾ inch Polyvinyl chloride end cap) |
| 22 | Chamber with the crimped end of the loop (filled with epoxy) |
| 23 | Plug (used to keep the uncured epoxy in place) (cork, rubber etc) |
| 24 | First (outside) pipe (¾ inch thin wall polyvinyl chloride pipe) |
| 25 | Second (inside) pipe (½ inch polyvinyl chloride pipe) |
| 26 | Electrical splicing lug (used to connect the cable ends together) |

DETAILED DESCRIPTION

This invention is primarily intended to be used when a dangerous snake is discovered on residential property. Using this invention the homeowner can stay a safe distance away from the dangerous snake while capturing the snake and removing the danger. The snake catcher can be stored outside where it can be quickly used when needed.

The snake catcher is made with a first pipe of ¾-inch thin wall polyvinyl chloride pipe 24 and a second pipe of ½-inch polyvinyl chloride pipe 25. It also has one ¾-inch polyvinyl chloride end cap 21 and about 18 inches of plastic coated steel cable 20. The cable is the same type cable that is used for clothesline.

The length of the ½-inch pipe 25 is about five feet. The ¾-inch pipe 24 is about 6 inches shorter. The ½-inch pipe 25 is placed inside the ¾-inch pipe 24 and is free to move in and out. The exposed end of the inside pipe 25 is used to push the pipe in and pull the pipe out of the outside pipe 24.

Two holes, slightly larger than the diameter of the plastic coated steel cable 20, are drilled into the end of the end cap. The holes should be at least ¾-inch apart. Each end of the plastic coated steel cable 20 is passed through a different hole and into the end cap 21. The two cable ends are crimped together using an electrical lug 26.

A plug 23 is pushed about 1½-inch into the top end of the ½-inch pipe. The plug may be made of cork, rubber or similar material that will make a tight seal. The plug 23 is needed to seal the pipe so the epoxy will not run out. After the epoxy has cured the plug serves no purpose. The crimped ends of the cable ends are placed in the bottom of the chamber 22 that is formed above the plug 23. Epoxy paste is used to fill the chamber 22. After the epoxy has cured, the end cap 21 is glued to the end of the ¾-inch pipe. The loop in the cable will be large after the inside pipe 25 is pushed toward the end cap 21 FIG. 2 and the loop will become small when it is pulled away from the end cap 21 FIG. 1.

What is clamed is:

1. An elongated, hand held, manually operated, weather resistant device for capturing snakes comprising:

(a) a first polyvinyl chloride pipe, being at least 4.5 feet long, with a polyvinyl chloride end cap covering one end thereof;

(b) said polyvinyl chloride end cap further includes two holes in one end thereof which extend both completely through the end cap and along a longitudinal axis of the end cap;

(c) a second polyvinyl chloride pipe, being at least 5 feet long, having a smaller diameter than a diameter of the first pipe, movably disposed inside of said first polyvinyl chloride pipe such that it is co-axial with and can move longitudinally relative to said first pipe;

(d) a plastic coated steel cable having two ends, each end passing through one of said two holes in said polyvinyl chloride end cap, the ends being attached to each other, said cable forming a loop outside of said first polyvinyl chloride pipe and said end cap;

(e) a plug positioned within the second pipe such that it is spaced from one end of the second pipe, the space defined inside of the second pipe between the one end of the second pipe and the plug receiving a curable material therein, the attached ends of the cable being set in the material so as to attach the cable to the second pipe adjacent to the one end of the second pipe;

whereby the size of said loop is controlled by the position of said second pipe inside of said first pipe, wherein moving the one end of the second pipe away from the one end of the first pipe makes the loop smaller and moving the one end of the second pipe toward the one end of the first pipe makes the loop larger.

\* \* \* \* \*